United States Patent
Sansone

(10) Patent No.: US 6,567,008 B1
(45) Date of Patent: May 20, 2003

(54) METHOD AND SYSTEM FOR DETECTION OF CONTAMINANTS IN MAIL PIECES

(75) Inventor: Ronald P. Sansone, Weston, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 10/139,029

(22) Filed: May 2, 2002

(51) Int. Cl.[7] .............................................. G08B 21/00
(52) U.S. Cl. ........................ 340/666; 340/676; 340/683; 340/688; 177/25.15; 177/121; 177/25.14; 177/145; 177/154; 209/900
(58) Field of Search ................................. 340/666, 676, 340/683, 680; 177/25.15, 121, 25.14, 145, 154; 209/900

(56) References Cited

U.S. PATENT DOCUMENTS

| | | | |
|---|---|---|---|
| 3,648,839 A | * 3/1972 | Bradshaw et al. | 209/593 |
| 4,778,018 A | 10/1988 | Cordery et al. | 177/210 |
| 4,856,604 A | 8/1989 | Sisson et al. | 177/210 |
| 5,154,246 A | * 10/1992 | DiGiulio et al. | 177/25.15 |
| 5,245,545 A | * 9/1993 | Taylor | 700/219 |
| 5,270,938 A | 12/1993 | Sansone et al. | 364/464.02 |

* cited by examiner

Primary Examiner—Benjamin C. Lee
Assistant Examiner—Tai T. Nguyen
(74) Attorney, Agent, or Firm—Brian A. Lemm; Angelo N. Chaclas; Charles R. Malandra, Jr.

(57) ABSTRACT

A method and system for determining if a mail piece contains a loose particulate matter is disclosed. The mass of each mail piece is determined twice utilizing a vibrating tray scale. During one determination, the mass of everything contained within the mail piece, including any type of loose particulate matter, is included. During the other determination, the mass of any loose particulate matter contained within the mail piece is not included. If the mail piece contains any type of loose particulate matter, there will be a difference in the masses of the mail piece as determined by the vibrating tray scale, indicating the mail piece may contain a lose particulate matter. The mail piece can then be diverted from the normal processing path for further inspection, thereby preventing cross-contamination of other mail pieces and processing equipment.

32 Claims, 5 Drawing Sheets

METHOD AND SYSTEM FOR DETECTION OF CONTAMINANTS IN MAIL PIECES

FIELD OF THE INVENTION

The invention disclosed herein relates generally to the processing of mail, and more particularly to a method and system to detect possible contaminants in the form of loose particulate matter contained within a mail piece.

BACKGROUND OF THE INVENTION

The United States accounts for the largest domestic letter traffic in the world, handling almost 200 billion pieces of mail each year. The United States Postal Service (USPS) employs more than 850,000 employees and operates more than 44,000 post offices throughout the country. In many respects, the economy of the country is dependent upon the postal system being able to efficiently and quickly deliver mail pieces. Any type of major disruption in the delivery of mail could have potentially serious detrimental effects on the country as a whole.

Recently, attempts have been made to disrupt the postal system and use it as a weapon of terror and fear by the inclusion of harmful chemical or biological contaminants, such as, for example, the spore-forming bacterium *Bacillus anthracis* (anthrax), within or on a mail piece. Such contaminants can be carried in several forms, including for example, a powder form. The harmful effects of only a few contaminated mail pieces can be far reaching, as cross-contamination of other mail pieces can easily occur when the mail pieces come in contact with each other or are passed through the same machines during sorting. The Centers for Disease Control and Prevention estimates that tens of thousands of mail pieces could have become cross-contaminated from only two contaminated mail pieces. The use of the postal system for such purposes has resulted in the need for a reliable way to detect small amounts of loose and possibly dangerous particulate matter contained within a mail piece before they are processed by the postal authority or opened by the recipient.

Ideally, it would be desirous for the postal authority to examine and/or test each piece of mail individually for any possible contaminants before it enters the mail system, thereby isolating any contaminated mail pieces and preventing any cross-contamination. Such examination could be performed, for example, by visually inspecting each mail piece for a powdery substance contained therein. With the large volume of mail processed daily, however, the cost and time associated with visually inspecting each piece of mail makes such inspection unfeasible. It is imperative that any such testing and/or examination be capable of being performed both cost effectively and quickly to avoid delays in processing and delivering the mail.

Thus, there exists a need for a reliable way to quickly and cost effectively detect small amounts of loose and possibly dangerous particulate matter contained within a mail piece.

SUMMARY OF THE INVENTION

The present invention alleviates the problems associated with the prior art and provides a method and system that can quickly and cost effectively detect small amounts of loose particulate matter contained within a mail piece.

In accordance with the present invention, the mass of each mail piece is determined two times utilizing a vibrating tray scale. During the first mass determination, pressure is applied to the entire surface of the mail piece to secure it to the scale tray, thereby including the mass of everything contained within the mail piece, including any type of loose particulate matter. During the second determination, pressure is applied to only a plurality of discrete individual pressure points on the mail piece to secure it to the scale tray, thereby allowing any loose particulate matter contained within the mail piece to still move freely within the mail piece. Accordingly, the mass of any such loose particulate matter will not be included in the total mass of the mail piece as determined by the vibrating tray scale during this measurement.

If the mail piece contains any type of loose particulate matter, there will be a difference in the mass of the mail piece when the entire envelope is secured to the scale tray and the mass of the mail piece when only portions of the mail piece are secured to the scale tray as determined by the vibrating tray scale. The mail piece can then be diverted from the normal processing path for further inspection, thereby preventing cross-contamination of other mail pieces and processing equipment.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which.

DETAILED DESCRIPTION OF THE PRESENT INVENTION

Figure 1:
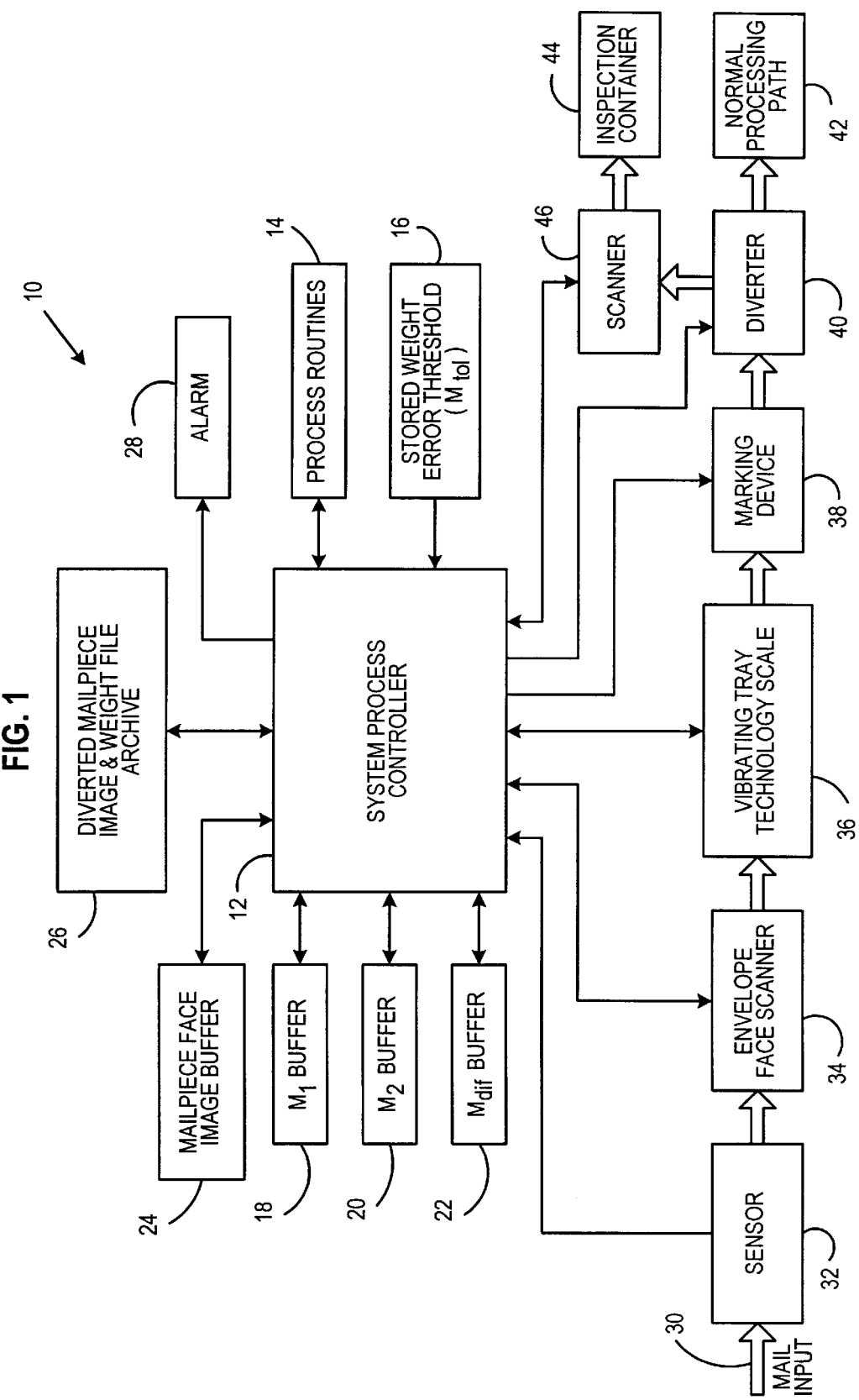
FIG. 1 illustrates in block diagram form a detection system according to the present invention.
Figure 2:
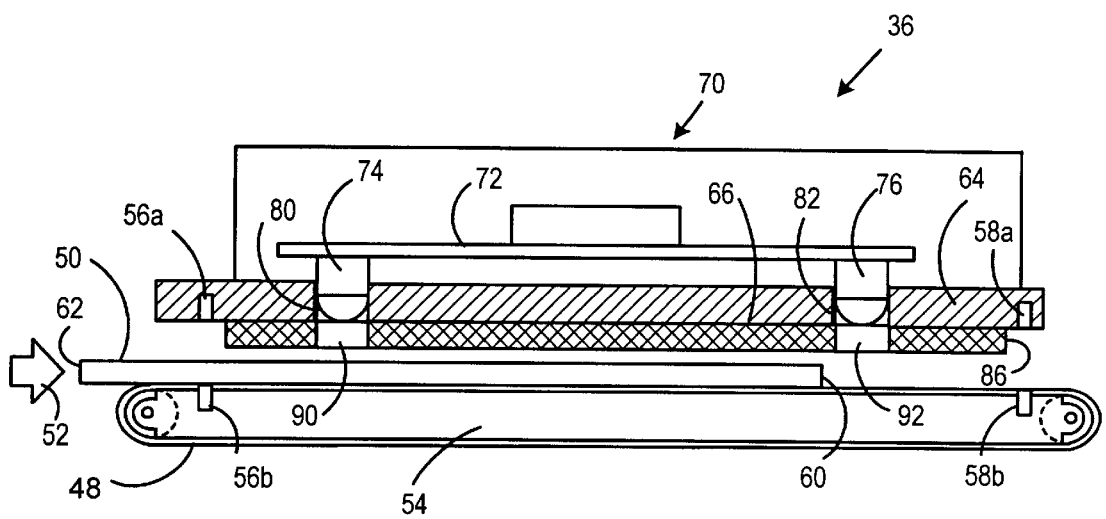
FIG. 2 illustrates a portion of a vibrating tray scale as a mail piece is received according to an embodiment of the present invention.

In describing the present invention, reference is made to the drawings, wherein there is seen in FIG. 1 in block diagram form a system 10 for detecting loose particulate matter in a mail piece, such as, for example, an envelope, according to the present invention. System 10 includes a system process controller 12 upon which process routines 14 are performed for control and operation of the system 10. A memory device 16 stores a predetermined mass error tolerance threshold ($M_{tol}$) for use by controller 12 to determine if loose particulate matter is present in a mail piece as described below. A plurality of buffers 18, 20, 22, and 24 are provided for storing information utilized by controller 12 as will be further described below. It should be understood that while a separate memory device 16 and several separate buffers 18–24 are illustrated, the invention is not so limited and one or more memory devices/buffers could be utilized to store any information needed by controller 12. Optionally, an archive 26 may be provided for archiving information related to any diverted mail pieces as further described below. An alarm 28, such as, for example, an audio or visual indicator, is coupled to controller 12 to indicate to an operator that a suspect mail piece has been detected as further described below.

Mail pieces enter the system 10 at mail input 30 and are detected by a sensor 32. Optionally, system 10 can also include an imaging system, such as, for example, an envelope face scanner 34, for capturing images of the mail pieces as they are input to the system 10. The captured images of the mail pieces are stored in the mail piece face image buffer 24. The mail pieces are then passed to a scale 36 that utilizes vibrating tray technology (VTT) to determine the mass of each mail piece. A VTT scale utilizes the principles of harmonic vibration for the purposes of determining the mass of an article. A flexibly mounted platform is caused to oscillate by an initial excitation action. The frequency of the oscillation is primarily dependent upon the total mass of the platform, and anything connected thereto, and the platform spring constant. An object is placed upon the platform and the platform is caused to oscillate by applying an exciting pulse. The period of oscillation of the platform with the article of unknown mass thereon is determined and by comparing the period with known oscillation periods (determined during calibration tests), the mass of the article can be determined using derived equations. For a complete description of the theory and operation of scales that utilize vibrating tray technology, reference is made to U.S. Pat. Nos. 4,778,018, 4,856,604, and 5,270,938, the entirety of which are hereby specifically incorporated by reference. Scale 36 can perform up to two measurements per second with a resolution of 0.001 ounces and accuracy of at least 0.01 ounces.

System 10 further includes an optional marking device 38, to provide a visual mark on the face of suspected mail pieces, and diverter 40. If controller 12 determines that a mail piece does not contain loose particulate matter (as described below), diverter 40 will pass the envelope into the normal processing path 42. If, however, controller 12 determines that a mail piece may contain loose particulate matter, diverter 40 will divert the mail piece to an alternate path, such as, for example, to an inspection container 44, for further evaluation and inspection of the mail piece. Optionally, system 10 can include a scanner 46 to provide an image of the diverted mail piece, including the mark put on the mail piece by marking device 38, to system controller 12 for archiving as will be described below.

In accordance with the present invention, the system 10 determines if a mail piece contains loose particulate matter by determining the mass of the mail piece, utilizing scale 36, under two different conditions. During one determination, substantially the entire mail piece is temporarily secured or clamped against the tray of scale 36. Accordingly, everything contained within the mail piece, including any type of loose particulate matter, will be included in determining the mass of the mail piece. During the other measurement, the mail piece is secured or clamped to the tray of the scale 36 at only a few predetermined locations, thereby allowing any loose particulate matter within the mail piece to still move freely within the mail piece. Thus, during this measurement, the mass of any matter not secured to the tray of scale 36 will not be included in the determination of the mass of the mail piece.

Referring now to FIGS. 2–5, the processing of a mail piece, such as, for example, an envelope 50, by scale 36 is generally illustrated. An envelope 50 is fed into the scale 36 in the direction as indicated by arrow 52. The envelope 50 is input to scale 36 between lower tray 54 and upper tray 64 utilizing a transport device such as, for example, a transport belt 48. Entry of the envelope 50 into the scale 36 is detected by the leading edge 60 of envelope 50 passing between a pair of corresponding sensors 56a, 56b located in trays 64, 54 respectively. Once the envelope has completely entered the scale 36, sensors 56a, 56b will detect the trailing edge 62 of the envelope 50 and the envelope 50 will come to a stop between the trays 54, 64.

Scale 36 is provided with a clamping device 70 to secure the envelope 50 during determination of the mass of envelope 50. Clamping device 70 includes a movable support member 72 upon which a plurality of pins are mounted, such as, for example, pins 74, 76. It should be understood that while two pins 74, 76 are illustrated, the invention is not so limited and any number of pins can be utilized. Pins 74, 76 are positioned such that they are aligned with openings 80, 82, respectively, in tray 64. When support member 72 is in a raised position, the tips of pins 80, 82 preferably do not extend below the lower surface 66 of tray 64. A cushioning member 86 is secured to the lower surface 66 of tray 64. Cushioning member 86 is preferably formed of a soft polymeric material such that it compresses slightly when upper tray 64 is brought into contact with lower tray 54. Cushioning member 86 includes openings 90, 92 that are aligned with openings 80, 82 in upper tray 64.

Figure 3:
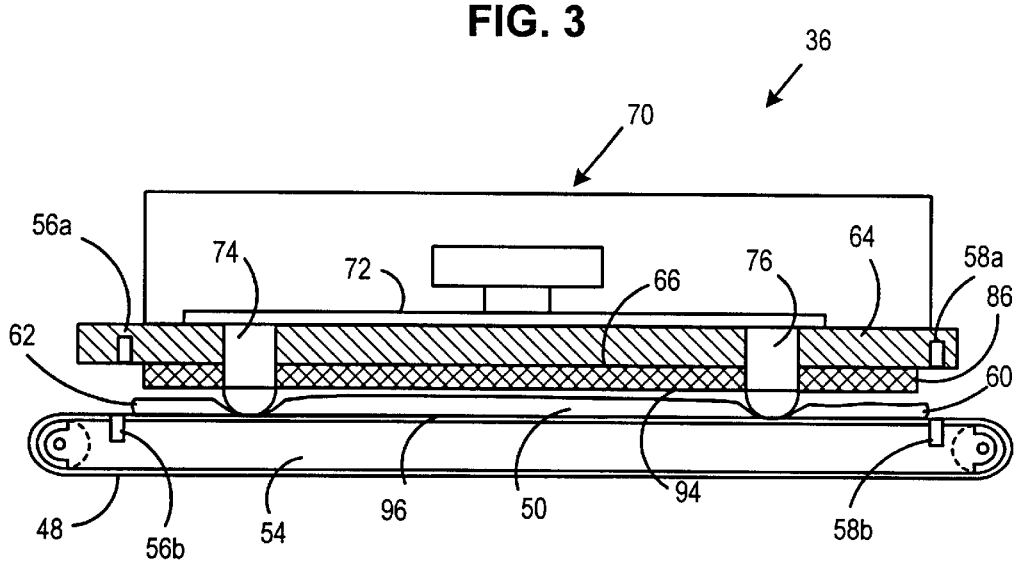
FIG. 3 illustrates determination of the mass of a mail piece, including any loose particulate matter, according to an embodiment of the present invention.

Referring now to FIG. 3, there is illustrated the scale 36 during a first mass determination of the envelope 50. During the first determination, certain contents of the envelope 50, as described below, can move freely within the envelope 50. When the envelope 50 has been positioned between the trays 54, 64, support member 72 is moved into its lowered position, thereby causing pins 74, 76 to project below the lower surface of tray 64 and the lower surface 94 of cushion 86. Clamping device 70 is then moved towards tray 54 such that the envelope 50 is firmly secured between the tips of pins 74, 76 and the top surface 94 of tray 54. Preferably, a small gap exists between the lower surface of cushion 86 and the envelope 50. Accordingly, the envelope 50 is secured in a discrete number of locations, which while securely holding any large material, such as inserts or letters, within envelope 50, allows any small materials, such as, for example, a loose particulate matter, to still move within the envelope 50. The entire platform, including trays 54, 64 and clamping device 70, is then oscillated and the mass of the envelope 50 is determined utilizing the period of oscillation. The use of vibrating tray technology to determine the mass of the envelope 50 will effectively eliminate the effect of any type of loose material, such as particulate matter, that is contained within the envelope 50 upon the determination of the mass of the envelope 50, since the loose material is essentially "floating" during the oscillation of the envelope 50.

Figure 4:
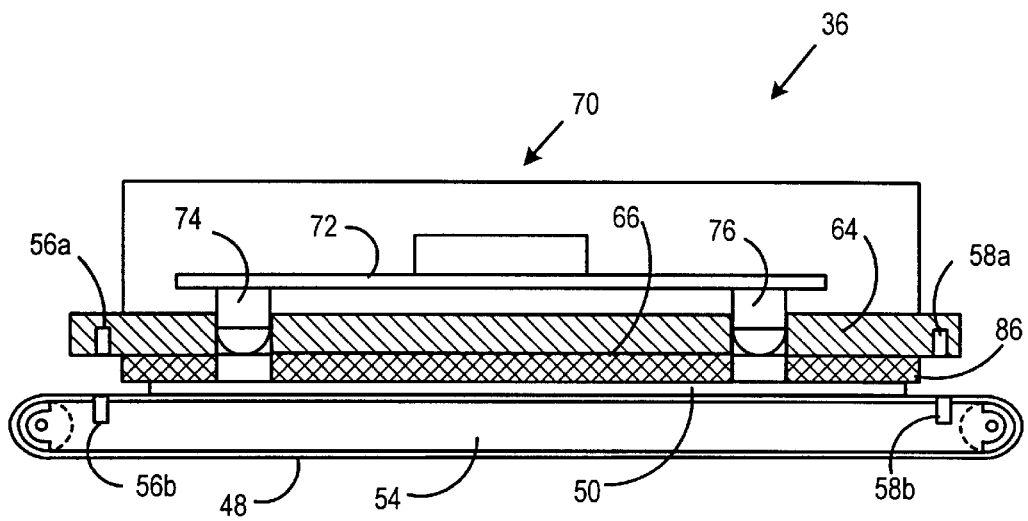
FIG. 4 illustrates determination of the mass of a mail piece, not including any loose particulate matter, according to an embodiment of the present invention.

Referring now to FIG. 4, once the determination of the mass of envelope 50 has been determined with the envelope secured to the tray in only a small number of locations, a second determination is performed. Specifically, support member 72 is moved into its upper position, thereby causing pins 74, 76 to raise such that the tips of pins 74, 76 do not extend below the lower surface 66 of tray 64. Clamping device 70 is then moved closer to tray 54 such that the cushion 86 makes contact with the envelope 50 and the envelope 50 is secured between the cushion 86 and lower tray 54. Preferably, the entire surface area or substantially all of the surface area of the face of envelope 50 is secured between the cushion 86 and lower tray 54. Since the cushion 86 contacts the envelope 50 over a substantial portion, if not all, of the face of envelope 50, all of the contents of the envelope 50, including any loose particulate matter contained therein, will contribute to the determination of the mass of the envelope 50. The entire platform, including trays 54, 64 and clamping device 70, is then oscillated again and the mass of the envelope 50 is determined, including the mass of any particulate matter contained within envelope 50. For a more detailed discussion of the description and operation of scale 36, reference is made to U.S. application Ser. No. (Attorney Docket No. F-453), which is hereby incorporated by reference.

Figure 5:
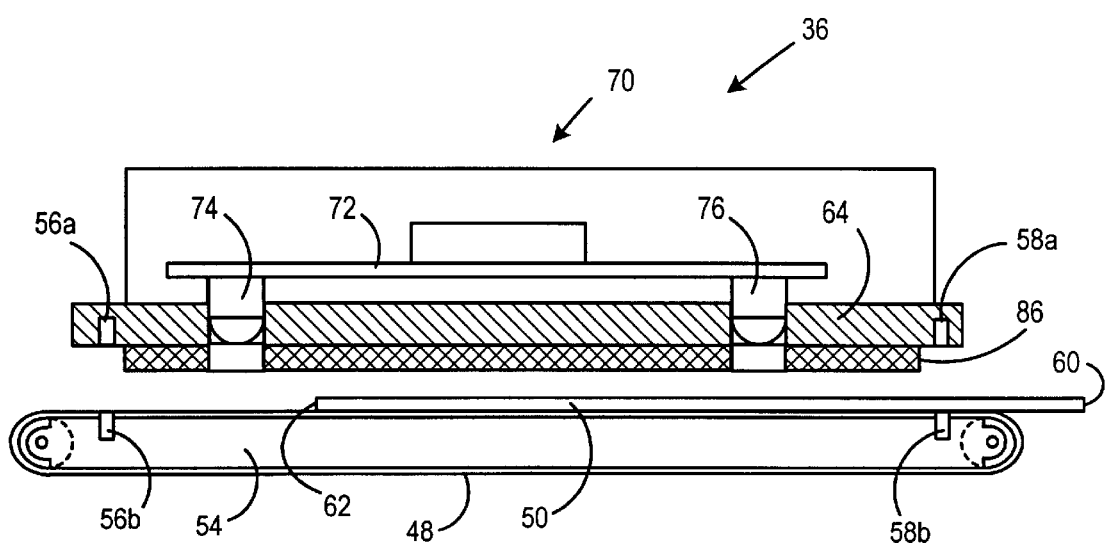
FIG. 5 illustrates a mail piece exiting the vibrating tray scale according to the present invention.

Referring now to FIG. 5, once both determinations of the mass of the envelope 50 have been performed, the envelope 50 exits from the scale 36. Clamping device 70 will move away from the lower tray 54, thereby releasing the envelope 50 from between the cushion 86 and tray 54, and allowing the envelope to exit from the scale 36 via transport belt 48. The envelope 50 has completely exited the scale 36 when the corresponding pair of detectors 58a, 58b detect the trailing edge 62 of envelope 50. Scale 36 is then ready to accept another envelope for processing.

The complete operation of the system 10 for detecting loose particulate matter within a mail piece will now be described with respect to the flow diagram of FIG. 6. In step 100 controller 12 determines if a mail piece, such as, for example, an envelope 50, is detected by sensor 32. If an envelope 50 is not detected, controller 12 continues monitoring for an envelope 50. If an envelope 50 is detected by sensor 32, then in step 102 an image of the face of the envelope 50 is taken by the envelope face scanner 34, if provided, and buffered in the mail piece face image buffer 24. In step 104, the envelope 50 is passed to scale 36 and the mass ($M_1$) of the envelope is determined as previously described with respect to FIG. 3, i.e., with the envelope 50 secured to the tray of scale 36 in a discrete number of locations, thereby allowing any small materials, such as, for example, a loose particulate matter, to still move within the envelope 50. The value for $M_1$ is stored in buffer 18. In step 106, the mass ($M_2$) is determined by scale 36 as previously described with respect to FIG. 4, i.e., with all or substantially all of the of the surface area of the face of envelope 50 secured to the tray of scale 36, thereby including any loose particulate matter contained therein in the determination of the mass of the envelope 50. The value for $M_2$ is stored in buffer 20. It should be understood, of course, that the order of steps 104 and 106 could be reversed, if desired. If the envelope 50 does not contain any type of loose matter, such as, for example, particulate matter in the form of powder, then the values for $M_1$ and $M_2$ will be nearly identical, if not identical. If the envelope 50 contains any loose particulate matter, then the value for $M_2$ will be greater than the value for $M_1$ for the reasons previously described with respect to FIGS. 3 and 4.

In step 108, the difference, $M_{dif}$ between $M_2$ and $M_1$ is determined and stored in buffer 22. In step 110, controller 12 determines if the value of $M_{dif}$ is greater than the value for the stored mass error threshold $M_{tol}$ 16. Since as noted above scale 36 is capable of determining the weight of a mail piece with a resolution of 0.001 ounces and accuracy of at least 0.01 ounces, the value for $M_{tol}$ can be set very low, thereby allowing for the detection of even very small amounts of particulate matter. If in step 110 it is determined that the value of $M_{dif}$ is not greater than the value for the stored mass error threshold $M_{tol}$ 16, thus indicating that there is no loose particulate matter contained within envelope 50, then in step 112 the envelope 50 is passed through the marking device 38, without being marked, and through diverter 40 to the normal processing path 42. In step 114, buffers 18–24 are cleared, and the process returns to step 100 to begin processing of another mail piece.

If in step 110 it is determined that the value of $M_{dif}$ is greater than the value for the stored mass error threshold $M_{tol}$ 16, thus indicating that envelope 50 may contain loose particulate matter, then in step 116 the envelope 50 is passed to marking device 38 where it is marked to identify the envelope 50 as suspected of containing loose matter, and in step 118 the envelope 50 is diverted by diverter 40 to inspection container 44 for further examination and evaluation. If scanner 46 is provided, then also in step 118 an image of the envelope 50 is taken and sent to controller 12 before the envelope 50 is sent to inspection container 44. In step 120, controller 12 triggers the alarm 28 to alert an operator that envelope 50 is a suspect mail piece and is being diverted to inspection container 44. Those envelopes that are sent to inspection container 44 can then be subject to further examination to determine if a contaminant is present in the envelope. In step 122, a file of the suspect envelope 50, further described below, is produced, utilizing the image taken by scanner 46, or alternatively, if scanner 46 is not present, the image taken by scanner 34 and stored in mail piece face image buffer 24, and archived in diverted mail piece image and weight file archive 26. In step 114, buffers 18–24 are cleared, and the process returns to step 100 to begin processing of another mail piece.

It should be noted that while scale 36 determines mass as opposed to weight, the scale 36 may also be referred to as a weighing device, since determination of the weight of an article can easily be determined from the mass. Accordingly, the system 10 could also be utilized to determine the weight of the envelope 50, based on the determined mass. A determination as to whether loose particulate matter is contained therein can then be made by comparing the two values for the weight of the envelope 50. Additionally, it should be noted that while system 10 is described as having a single scale 36 that can perform both determinations, the invention is not so limited and two separate scales, one for determining the mass (or weight) of the envelope including any loose particulate matter contained therein and the other for determining the mass (or weight) of the envelope excluding any loose particulate matter contained therein, could also be utilized.

Figure 6:
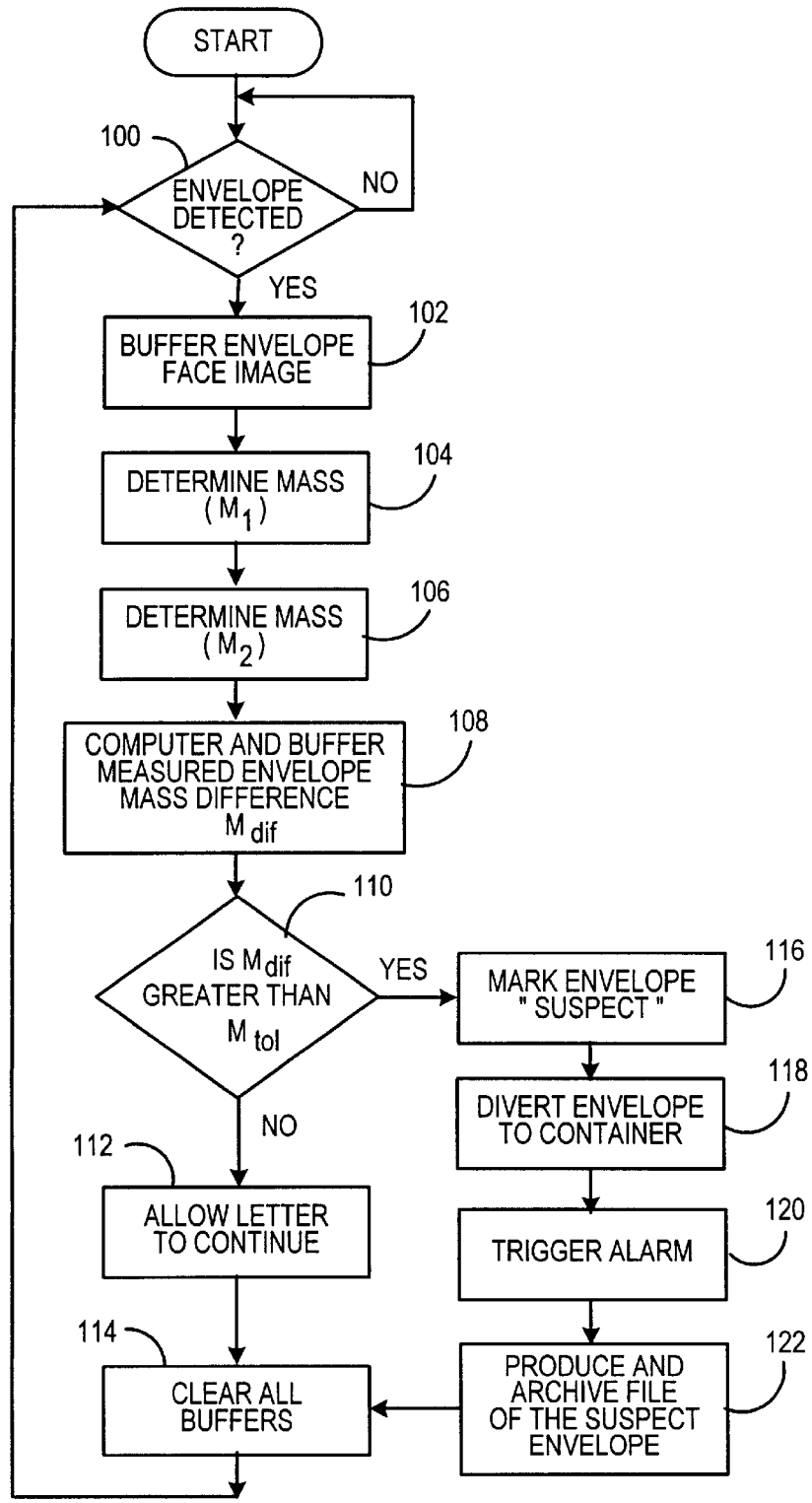
FIG. 6 illustrates in flow diagram form a process of testing mail pieces according to the present invention.
Figure 7:
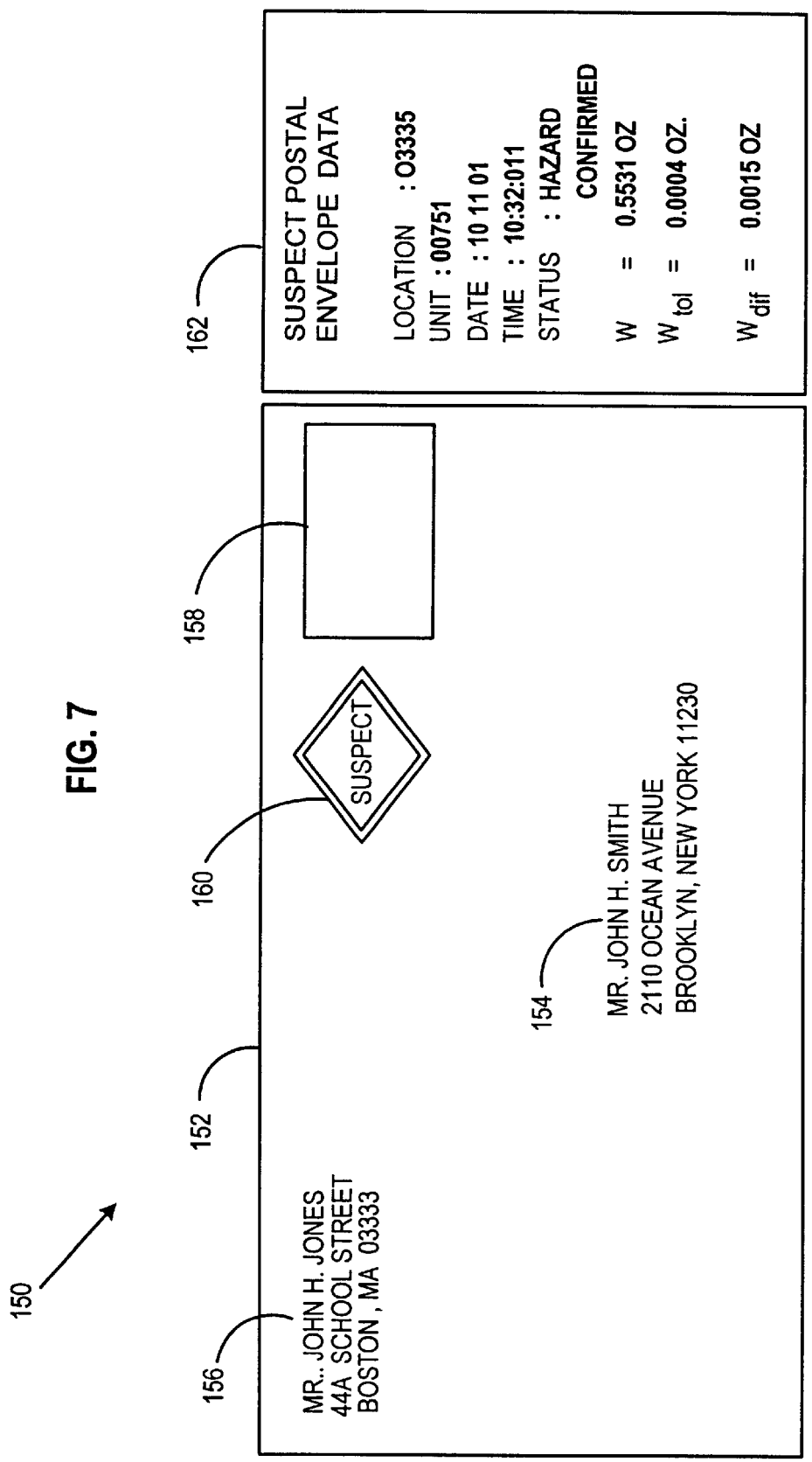
FIG. 7 illustrates a data record for a suspect mail piece according to the present invention.

Referring now to FIG. 7, there is illustrated an example of a data record 150 of a suspect envelope 50 created in step 122 of FIG. 6. Data record 150 includes, for example, an image 152 of the face of the envelope 50, including the addressee information 154, return address information 156, postage or indicia information 158, and, if scanner 46 is present, a mark 160 printed on the mail piece by marking device 38. If the image for data record 150 is from scanner 34, then mark 160 will not be present. Data record 150 could also include a data information field 162 that includes identifying information for the suspect envelope 50, such as, for example, the location number and unit number for the system 10 that processed the envelope, that date and time that the envelope 50 was processed by system 10, a current status of the envelope 50, i.e., whether the contents of the envelope 50 have been identified as hazardous or not upon further inspection, the mass (or weight) of the envelope 50 (including any particulate matter contained within the envelope 50), the mass (or weight) error tolerance threshold ($W_{tol}$) used by system 10, and the mass (or weight) difference ($W_{dif}$) determined by controller 12 for envelope 50.

Thus, according to the present invention, the mass of each mail piece is determined two times utilizing a vibrating tray scale. During the first determination, pressure is applied to the entire surface or substantially all of the surface of the mail piece to secure it to the scale tray, thereby determining the mass of everything contained within the mail piece, including any type of loose particulate matter. During the second determination, pressure is applied to only a plurality of individual pressure points on the mail piece to secure it to the scale tray, thereby allowing any loose particulate matter contained within the mail piece to still move freely within the mail piece. Accordingly, the mass of any such loose particulate matter will not be included in the determination by the vibrating tray scale during this measurement. If the mail piece contains any type of loose particulate matter, there will be a difference in the determined masses of the mail piece as determined by the vibrating tray scale. The mail piece can then be diverted from the normal processing path for further inspection, thereby preventing cross-contamination of other mail pieces and processing equipment.

It should be understood that although the present invention was described with respect to mail processing by a post office, the present invention is not so limited and can be utilized in any application in which mail is received or sent. For example, the detection system could also be utilized by a business or company upon receipt of the mail. By utilizing the present invention at mail acceptance, prior to sorting the mail in the mailroom for internal delivery, any mail pieces suspected of containing a contaminant can be isolated and removed from the processing system, thereby protecting the intended recipient or other office personnel from possible exposure to the contaminant, along with preventing contamination of the company's sorting machines, as well as cross-contamination of any other mail pieces. Additionally, the detection system of the present invention could also be utilized by a business or company prior to sending mail. By utilizing the present invention prior to sending mail, a business or company could assure that the mail has not been tampered with and no possible contaminants have been added, at least while the mail piece was being prepared. Thus, the business or company could certify that the envelope, when originally sealed, did not contain any loose particulate matter.

While a preferred embodiment of the invention has been described and illustrated above, it should be understood that this is exemplary of the invention and is not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method for detecting particulate matter contained in a mail piece comprising the steps of:
    determining a first mass of the mail piece, the first mass determination excluding any particulate matter contained within the mail piece;
    determining a second mass of the mail piece, the second mass determination including any particulate matter contained within the mail piece;
    comparing the first determined mass and the second determined mass; and
    detecting the particulate matter based on the comparison of the first determined mass and the second determined mass.

2. The method according to claim 1, wherein the step of determining the first mass and the second mass further comprises:
    using a vibrating tray scale.

3. The method according to claim 2, wherein the step of determining the first mass further comprises:
    securing the mail piece to a tray of the vibrating tray scale in a discrete number of locations,
    wherein particulate matter contained in the mail piece can move within the mail piece.

4. The method according to claim 3, wherein the step of securing the mail piece further comprises:
    clamping the mail piece between a tray of the scale and at least one pin.

5. The method according to claim 2, wherein the step of determining the second mass further comprises:
    securing a substantial portion of the mail piece to a tray of the vibrating tray scale.

6. The method according to claim 5, wherein the step of securing further comprises:
    clamping the mail piece to the tray over a substantial portion of the mail piece.

7. The method according to claim 1, wherein the step of comparing further comprises:
    calculating a difference between the second determined mass and the first determined mass; and
    comparing the difference to a predetermined threshold.

8. The method according to claim 1, wherein if particulate matter is detected, the method further comprises:
    diverting the mail piece from a normal processing path.

9. The method according to claim 8, further comprising:
    marking the mail piece to indicate particulate matter may be contained within the mail piece.

10. The method according to claim 9, further comprising:
    capturing an image of the mail piece.

11. The method according to claim 10, further comprising:
    creating a data record of the mail piece, the data record including the image of the mail piece; and
    archiving the data record.

12. The method according to claim 8, further comprising:
    providing a signal to indicate the mail piece has been diverted from the normal processing path.

13. A method for processing a mail piece comprising the steps of:
    determining a first mass of the mail piece, the first mass determination excluding any particulate matter contained within the mail piece;
    determining a second mass of the mail piece, the second mass determination including any particulate matter contained within the mail piece;
    calculating a difference between the second determined mass and the first determined mass;
    comparing the difference to a predetermined threshold;
    diverting the mail piece from a normal processing path if the difference is greater than the predetermined threshold; and
    passing the mail piece to the normal processing path if the difference is not greater than the predetermined threshold.

14. The method according to claim 13, wherein if the difference is greater than the predetermined threshold, the method further comprises:
    marking the mail piece to indicate loose particulate matter may be contained within the mail piece.

15. The method according to claim 13, wherein the step of diverting further comprises:

signaling an alarm to an operator that the mail piece is being diverted.

16. The method according to claim 13, wherein if the difference is greater than the predetermined threshold, the method further comprises:

capturing an image of the mail piece.

17. The method according to claim 16, further comprising:

creating a data record of the mail piece, the data record including the image of the mail piece; and archiving the data record.

18. The method according to claim 13, wherein the step of determining the first mass and the second mass further comprises:

using a vibrating tray scale.

19. A system for processing mail comprising:

a scale adapted to determine a first mass of a mail piece, the first determined mass excluding any particulate matter contained within the mail piece, and a second mass of the mail piece, the second mass including any particulate matter contained within the mail piece;

a controller coupled to the scale, the controller comparing the first determined mass and the second determined mass; and a diverter coupled to the controller to direct the mail piece based on the comparison of the first determined mass and the second determined mass.

20. The system according to claim 19, wherein the scale is a vibrating tray scale.

21. The system according to claim 19, wherein the scale further comprises:

a first scale to determine the first mass of the mail piece; and a second scale to determine the second mass of the mail piece.

22. The system according to claim 19, wherein the controller is adapted to compare the first determined mass and the second determined mass by calculating a difference between the second determined mass and the first determined mass and comparing the difference to a predetermined threshold.

23. The system according to claim 22, further comprising:

a marking device coupled to the controller, the marking device being located between the scale and the diverter to mark the mail piece if the difference between the second determined mass and the first determined mass is greater than the predetermined threshold.

24. The system according to claim 22, further comprising:

a first processing path; and a second processing path, wherein the diverter directs the mail piece to the first processing path if the difference between the second determined mass and the first determined mass is not greater than the predetermined threshold and to the second processing path if the difference between the second determined mass and the first determined mass is greater than the predetermined threshold.

25. The system according to claim 24, further comprising:

a scanner coupled to the controller to capture an image of the mail piece if the mail piece is diverted to the second processing path.

26. The system according to claim 25, further comprising:

an archive to store the image of the mail piece.

27. The system according to claim 24, further comprising:

a signaling device coupled to the controller to signal when a mail piece has been diverted to the second processing path.

28. A mail processing system comprising:

a controller to control operation of the mail processing system;

a scanner coupled to the controller to capture an image of a mail piece;

a vibrating tray scale adapted to determine a first mass of the mail piece, the first determined mass excluding any particulate matter contained within the mail piece, and a second mass of the mail piece, the second mass including any particulate matter contained within the mail piece; and a diverter coupled to the controller to direct the mail piece to alternate processing paths based on a comparison performed by the controller of the first determined mass and the second determined mass.

29. The system according to claim 28, wherein the controller is adapted to compare the first determined mass and the second determined mass by calculating a difference between the second determined mass and the first determined mass and comparing the difference to a predetermined threshold.

30. The system according to claim 29, further comprising:

a marking device coupled to the controller to mark the mail piece if the difference between the second determined mass and the first determined mass is greater than the predetermined threshold.

31. The system according to claim 28, further comprising:

an archive to store the image of the mail piece.

32. The system according to claim 28, further comprising:

a signaling device coupled to the controller to signal when a mail piece has been diverted from a normal processing path.

* * * * *